Figure 1:
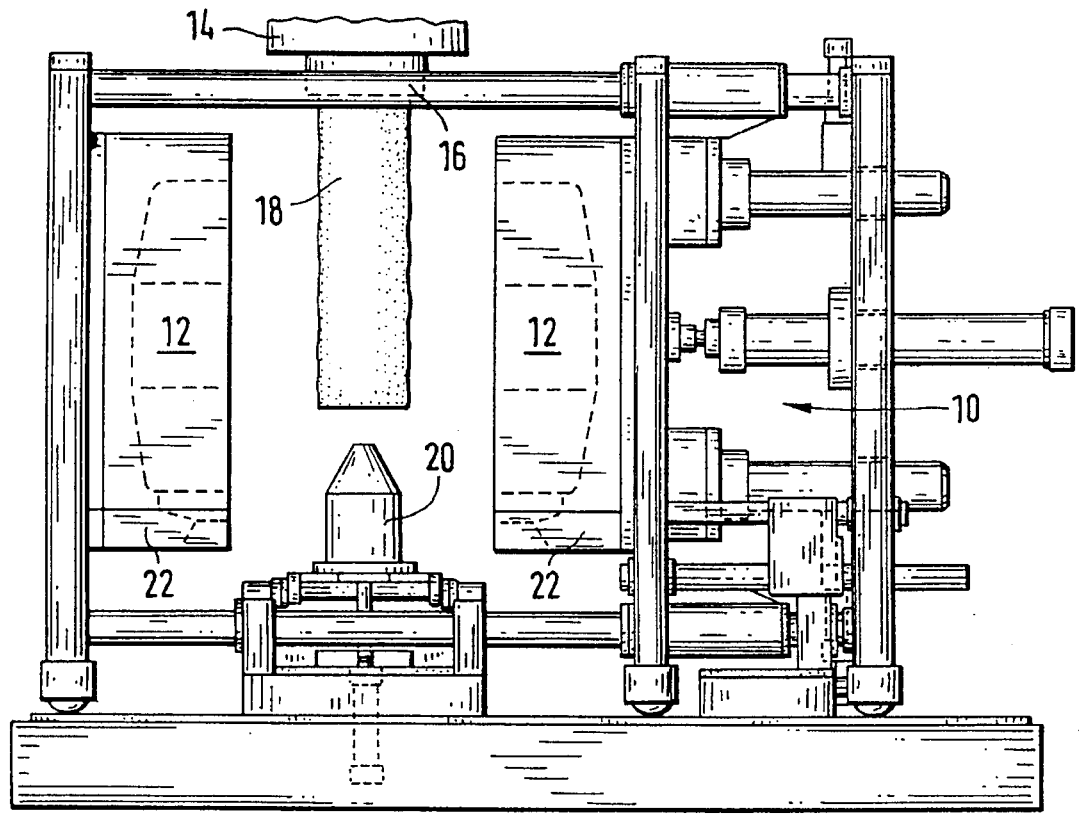

United States Patent [19]

Przytulla

[11] Patent Number: 5,571,474
[45] Date of Patent: Nov. 5, 1996

[54] BLOW MOULDING MACHINE

[75] Inventor: Dietmar Przytulla, Kerpen, Germany

[73] Assignee: Mauser-Werke GmbH, Brühl, Germany

[21] Appl. No.: 211,099

[22] PCT Filed: Apr. 8, 1992

[86] PCT No.: PCT/EP92/00800

§ 371 Date: May 18, 1994

§ 102(e) Date: May 18, 1994

[87] PCT Pub. No.: WO93/05942

PCT Pub. Date: Apr. 1, 1993

[30] Foreign Application Priority Data

Sep. 14, 1991 [DE] Germany .................. 41 30 717.8

[51] Int. Cl.[6] .................. B29C 49/02; B29C 49/28; B29C 49/48

[52] U.S. Cl. .................. 264/534; 425/183; 425/195; 425/525

[58] Field of Search .................. 264/523, 531, 264/534; 425/183, 185, 192 R, 195, 522, 525, 182; 249/102, 103, 104, 155

[56] References Cited

U.S. PATENT DOCUMENTS

| | | | |
|---|---|---|---|
| 3,050,773 | 8/1962 | Hagen | 264/534 |
| 3,354,509 | 11/1967 | Ammondson | 249/103 |
| 3,380,121 | 4/1968 | Chittenden et al. | 249/104 |
| 3,570,057 | 3/1971 | Doyle | 425/522 |
| 3,809,356 | 5/1974 | Doyel . | |
| 3,843,286 | 10/1974 | Horberg, Jr. et al. | 425/183 |
| 4,072,456 | 2/1978 | Appel et al. | 425/183 |
| 4,151,976 | 5/1979 | Schurman . | |
| 4,170,623 | 10/1979 | Dubois et al. | 264/534 |
| 4,177,934 | 12/1979 | Hammes et al. | 264/534 |
| 4,378,328 | 3/1983 | Przytulla et al. | 264/534 |
| 5,213,753 | 5/1993 | Przytulla et al. | 264/534 |
| 5,411,699 | 5/1995 | Collette et al. | 264/523 |

FOREIGN PATENT DOCUMENTS 0297196  1/1989  European Pat. Off. .

*Primary Examiner*—Catherine Timm
*Attorney, Agent, or Firm*—Henry M. Feiereisen

[57] ABSTRACT

The invention relates to a blow moulding machine for manufacturing blow moulded large-volume vessels with upset flange rings from thermoplastic synthetic material. By changing exchangeable ring inserts, it is possible for two generically completely different vessel types—a plugged vessel and a removable-cover vessel body—to be manufacturable in one and the same blowing mould.

12 Claims, 5 Drawing Sheets

BLOW MOULDING MACHINE

The invention relates to a blow moulding machine for manufacturing blow moulded hollow bodies, in particular large-volume vessels, from thermoplastic synthetic material, and to a corresponding manufacturing process.

Conventionally, the process technique for this is to extrude from the tubular die of an accumulator a tubular preform of thermoplastic synthetic material between the open halves of an appropriate blowing mould, and thereafter the blowing mould halves are closed, the preform is pinched in or off, above and below, between the blowing mould halves and is blown by means of blown-in compressed air to give a hollow body having an external shape corresponding to the internal contour of the respective blowing mould for example a large-volume synthetic material vessel.

For the apparatus, blow moulds are known for this in which, for example, closed plugged vessels having two plug holes in the upper surface and having flange rings arranged in the region close to the upper surface and/or lower surface (carrying and transport rings or handling rings or peripheral roll rings) can be manufactured. The technique used here, of upsetting peripheral flange rings by means of axially displaceable mould slides is also generally known to the person skilled the art.

Furthermore, blowing moulds are known in which the vessel body for removable-cover vessels (wide-necked packing drums) is blown outward. These blowing moulds also have a mould slide for upsetting on a peripheral casing flange as the counter-bearing for a clamp ring, similarly reaching over the outer flange of the vessel cover, at the upper vessel edge close to the vessel opening, which is the size of the diameter. Such blowing moulds, having a permanently incorporated annular mould slide, have proved useful in the manufacture of vessels and are used in many countries of the world for manufacturing high-quality synthetic material vessels having flange rings which are moulded out of the vessel wall or are upset.

If a vessel manufacturer wishes to change his blow moulding machine with a blowing mould for one vessel type, e.g. a plugged vessel, over to the manufacture of another vessel type, e.g. a removable-cover vessel, then first of all he needs for this a corresponding second blowing mould. Thus, of these capital-intensive (blowing) moulds, in each case only one mould can ever be used for the respective vessel manufacture while the other blowing mould lies unused in storage.

When changing over or switching from one vessel type to another vessel type, hitherto the first blowing mould and the corresponding blowing mandrel had to be dismantled and the second blowing mould and the associated fitting blowing mandrel had to be installed and set up. In addition, the functional operation or control of the blowing mould equipment must be adjusted or changed over to the other vessel type.

This procedure requires stopping the machine for several hours, with the corresponding loss of production.

It is thus the object of the present invention to provide the vessel manufacturer with a blow moulding machine having a new blowing mould by means of which the blow moulding machine may be changed over from a first vessel type to another second vessel type in a shorter time than hitherto.

In accordance with the invention, this object is achieved in that a single blowing mould is used as the basic mould for the first vessel type and remains installed on changing over, and only at least one corresponding ring insert for adapting the vessel shape to the other second vessel type is inserted into the blowing mould and is secured by means of appropriate securing means. The blow moulding machine according to the invention for achieving this object is characterized by a blowing mould which is constructed as the basic mould for manufacturing the first vessel type and which may be changed over by means of at least one corresponding ring insert which may be inserted into the blowing mould and secured within the blowing mould to give the vessel shape of the other second vessel type.

Advantageously, the ring part set for changing over for example from a plugged vessel to a removable-cover vessel body—or vice versa—may be exchanged without the blowing mould or the mould slide having to be removed from the blow moulding machine. This is advantageously achieved in that the securing means, preferably threaded screws, for securing the ring part set to the blowing mould or to the mould slide are accessible from the outside or from below and are manipulable. On changing over, the blowing mandrels are not changed and the blowing mould equipment is not altered to another type.

To manufacture a plugged vessel having a peripheral carrying and transport ring in the peripheral region of the vessel upper surface, in which at least one, preferably two plug hole openings are made, the blowing mould is equipped, at the mould side and/or at the corresponding associated fixed blowing mould part for upsetting the carrying and transport ring, with an exchangeable ring part set having the contour of the carrying and transport ring.

A carrying and transport ring of this type, which makes it possible for the first time for a synthetic material plugged vessel to be manipulated with the same vessel gripper mould (butterfly clip) such as a conventional plugged vessel of sheet steel, is known for example from EP-A-0 324 882.

To manufacture a removable-cover vessel body for the so-called "standard removable-cover vessel" which is known throughout the world, as known for example from DE-PS 25 44 491, in which the massive casing flange is upset at a certain spacing of about 40 mm below the vessel mouth on the outer wall of the vessel, the ring part set of the carrying and transport ring of the plugged vessel is merely exchanged and the ring part set for the removable-cover vessel body, which specifies the contour of the massive casing flange or corresponds thereto, is inserted.

Advantageously, the ring part set for the carrying and transport ring of the plugged vessel and the ring part set for the casing flange of the removable-cover vessel body comprise at least two peripheral ring pieces, with one ring piece as a contour ring being secured on the fixed blow moulded part and the other ring piece as a pinch ring being removably secured on the mould slide. Thus, by simply exchanging the ring part set—this work takes only few minutes—two completely different types (species) of synthetic material vessels can be manufactured in a single blowing mould. Here, it is not even necessary to alter the program of the machine control or to adapt or exchange the blowing mandrels, since the blowing mandrel or the two blowing mandrels (for constructing the plug hole connection pieces in the upper surface of the plugged vessel) always remain permanently installed and are used as well in the manufacture of the removable-cover vessel body. Thus, in manufacturing the removable-cover vessel body, the waste part (with slug) which is cut out of the removable-cover vessel opening, has the shape of the upper surface of the plugged vessel with plug openings. The waste part is comminuted and recycled directly into the extruder as raw material.

In an embodiment of the invention, it is provided for the blowing mould to have as the basic mould a second mould slide for upsetting a second peripheral ring as a surface roll ring at the transition region from the lower vessel wall to the vessel lower surface. With this, plugged vessels can thus be manufactured with upper and lower carrying and transport ring or removable-cover vessels can be manufactured with a lower surface roll ring. If a customer would like to have delivered, for example, plugged vessels or removable-cover vessels without the lower surface roll ring, then the ring insert for upsetting on the surface roll ring can be replaced by a blind ring insert having a smooth internal contour corresponding to the vessel surface. Then, the mould slide for the surface roll ring remains out of operation and synthetic material vessels can be manufactured without a surface roll ring just as easily.

As a further embodiment of the invention, it is provided for the blowing mould to have in the region for constructing the lower vessel wall a further blowing mould insert which, as seen in cross-section, is constructed to be wedge-shaped or triangular, with the broad side of the insert pointing towards the lower surface of the vessel and the narrow pointed side of the insert pointing towards the vessel mouth of the removable-cover vessel body. This further blowing mould insert for manufacturing conical removable-cover vessel bodies allows the range of possible vessel types which may be manufactured in one and the same blowing mould to be further expanded.

Figure 2:
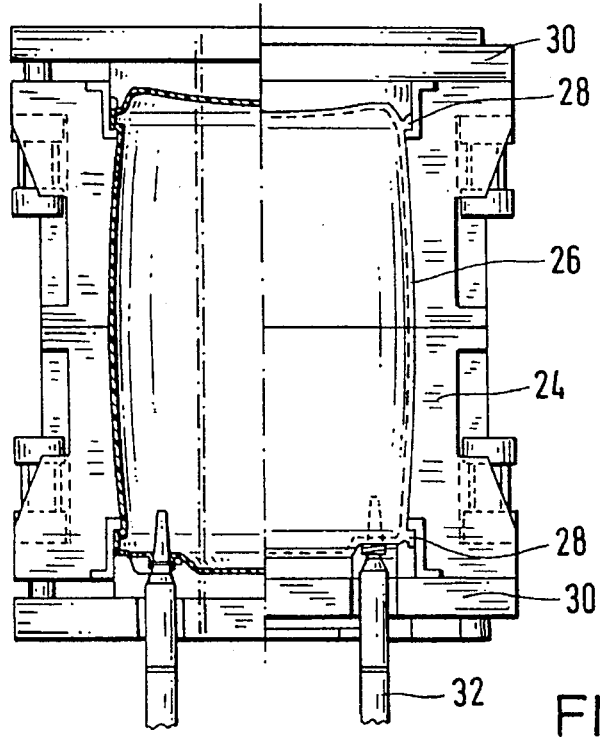
Figure 3:
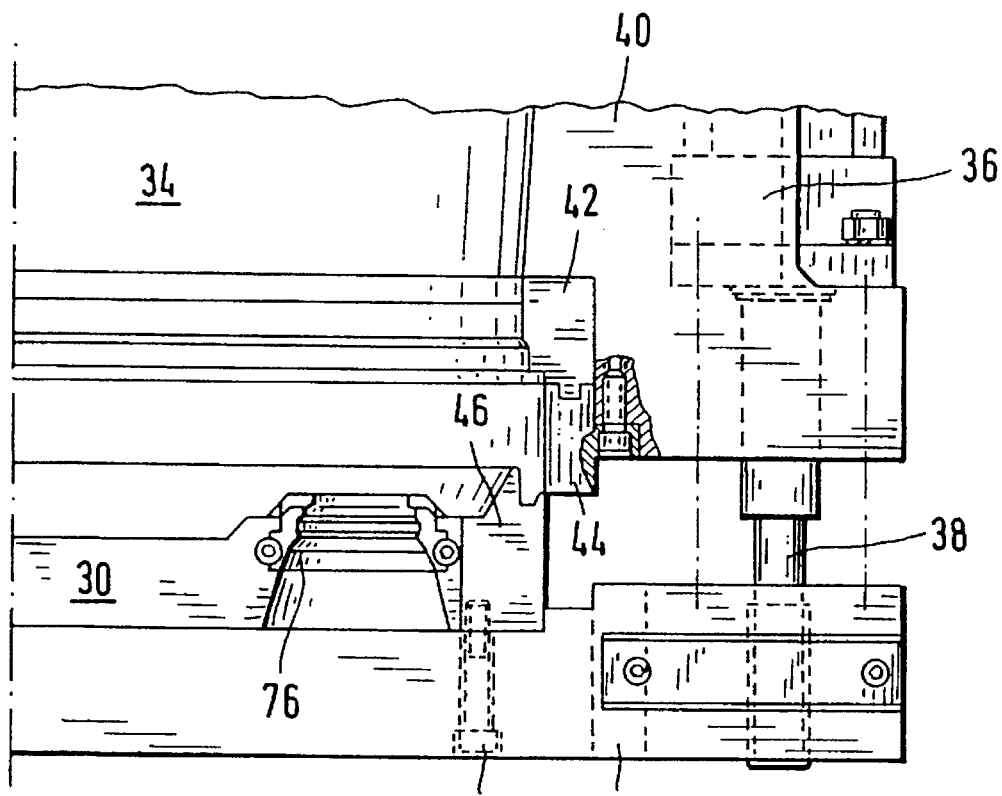
Figure 4:
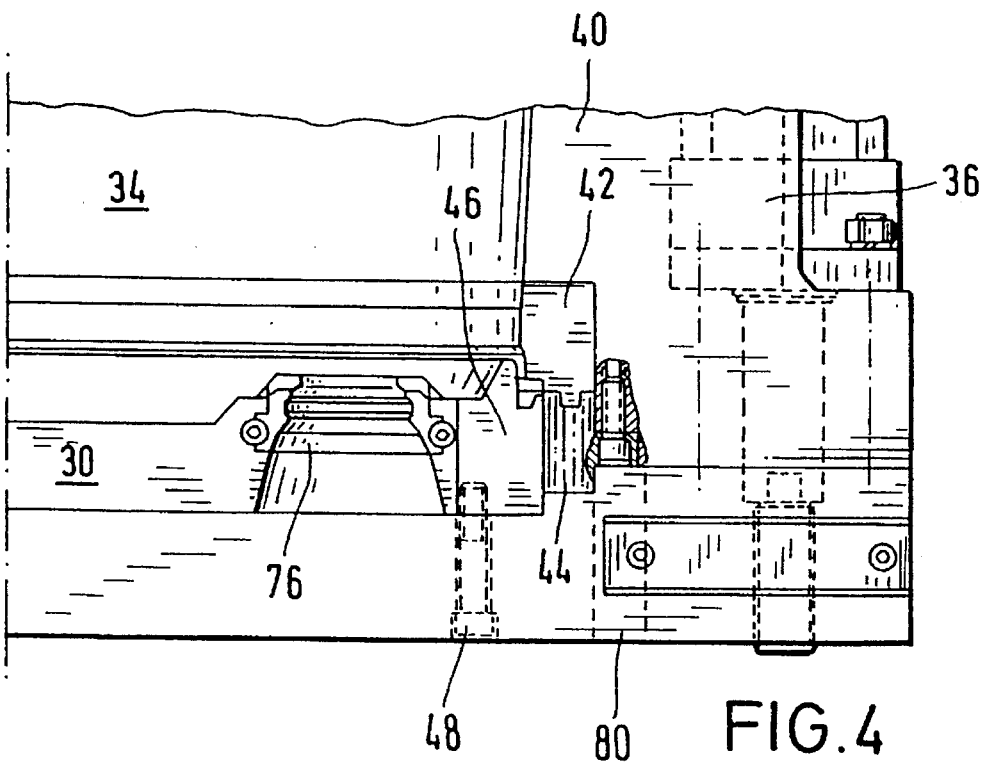
Figure 5:
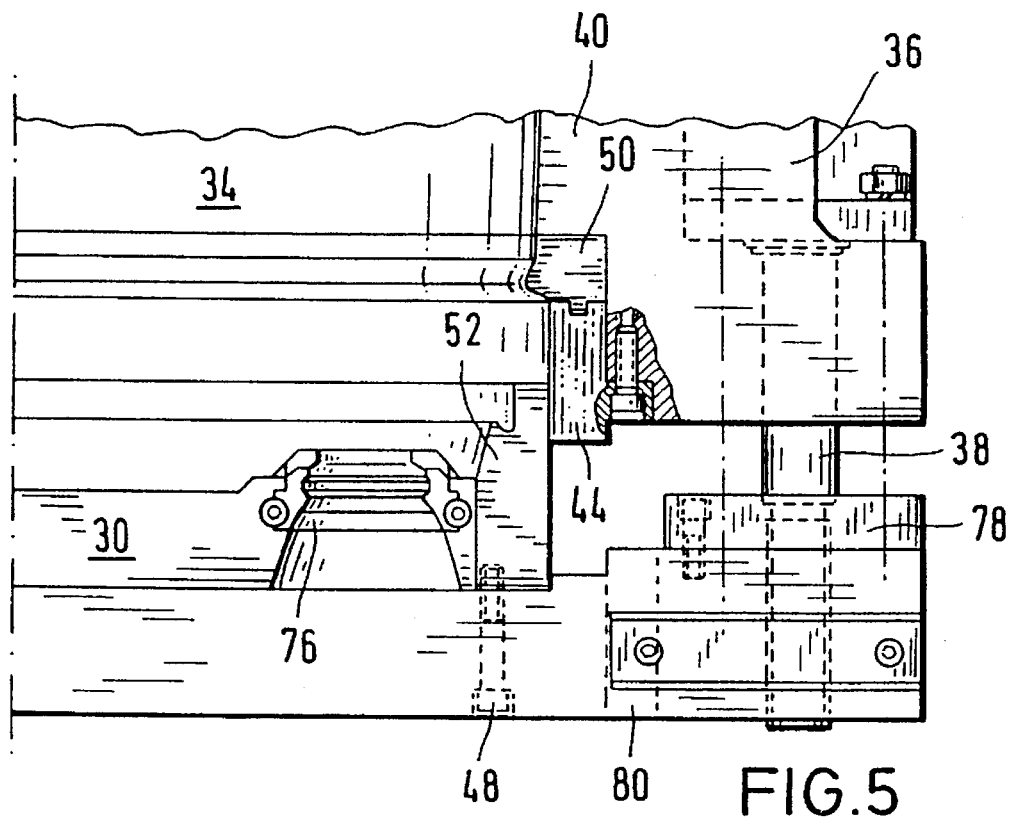
Figure 6:
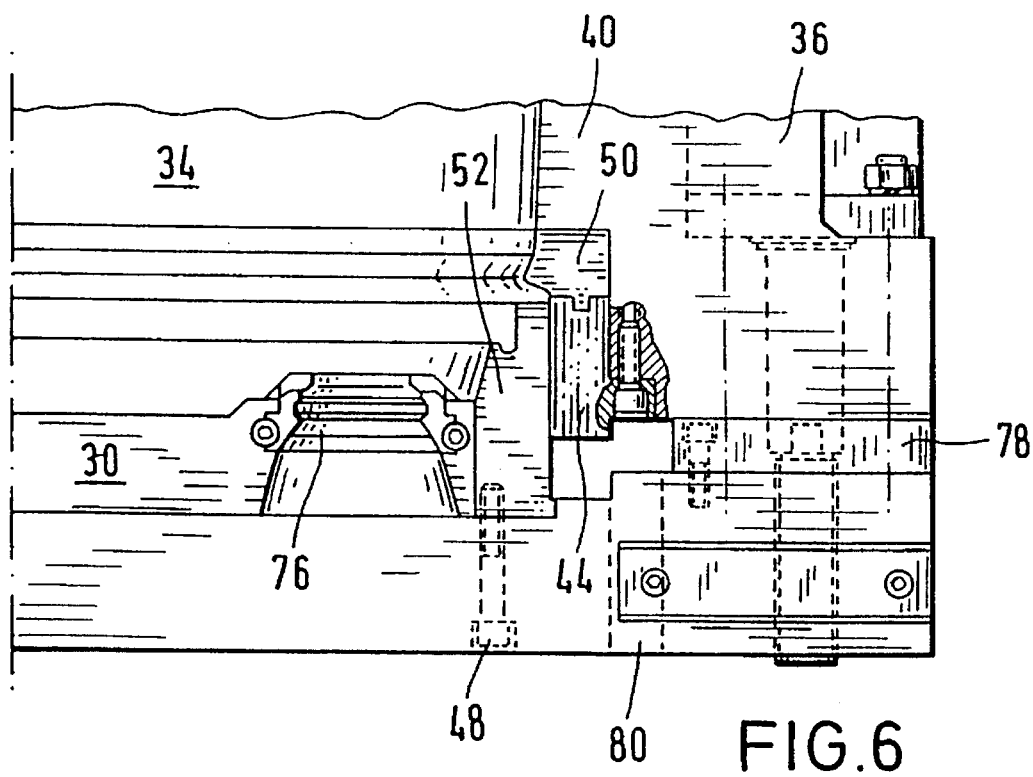
Figure 7:
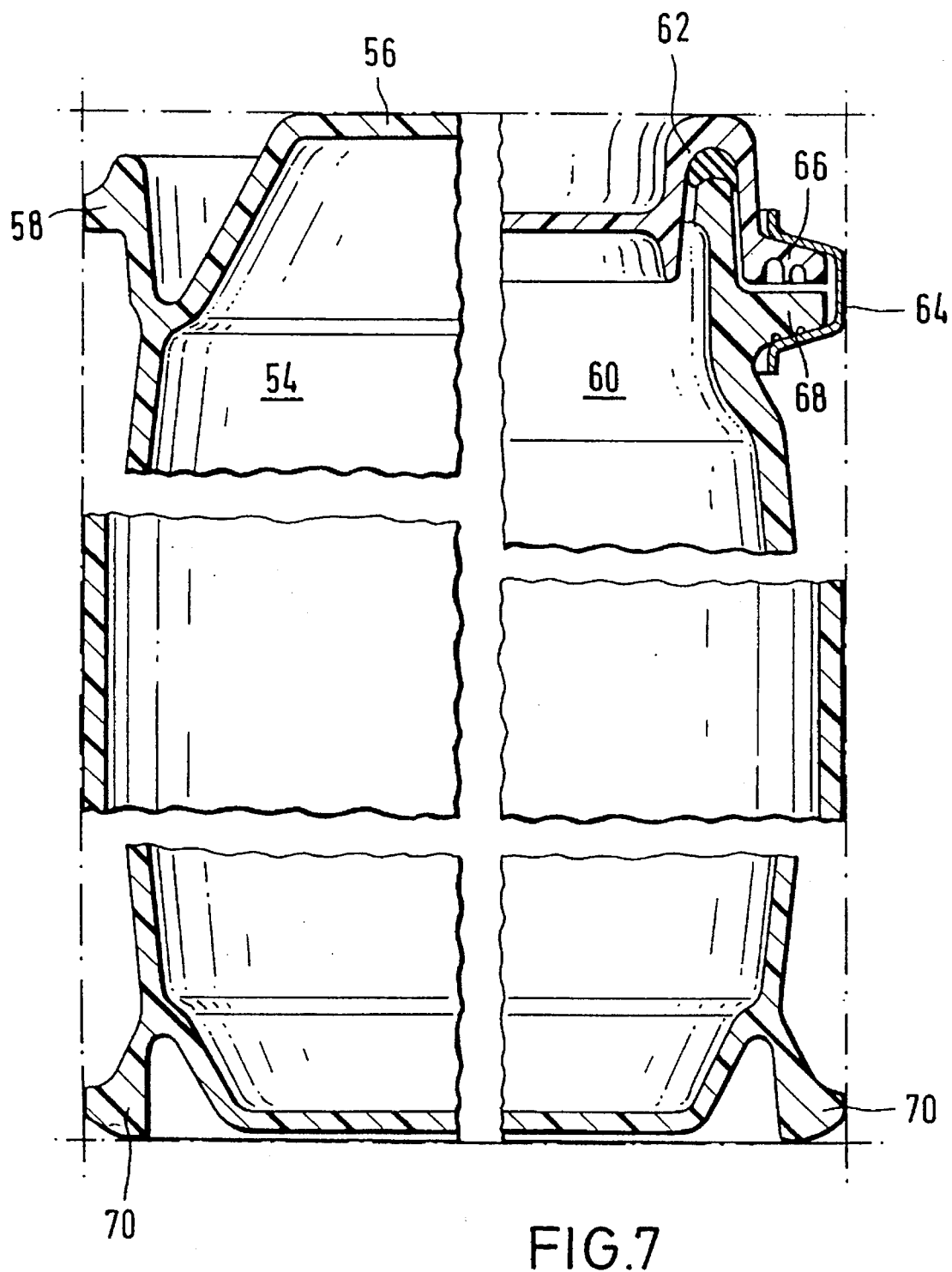
Figure 8:
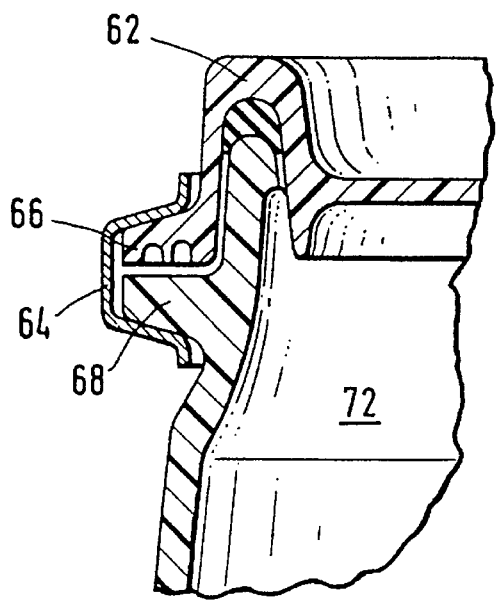
Figure 8:
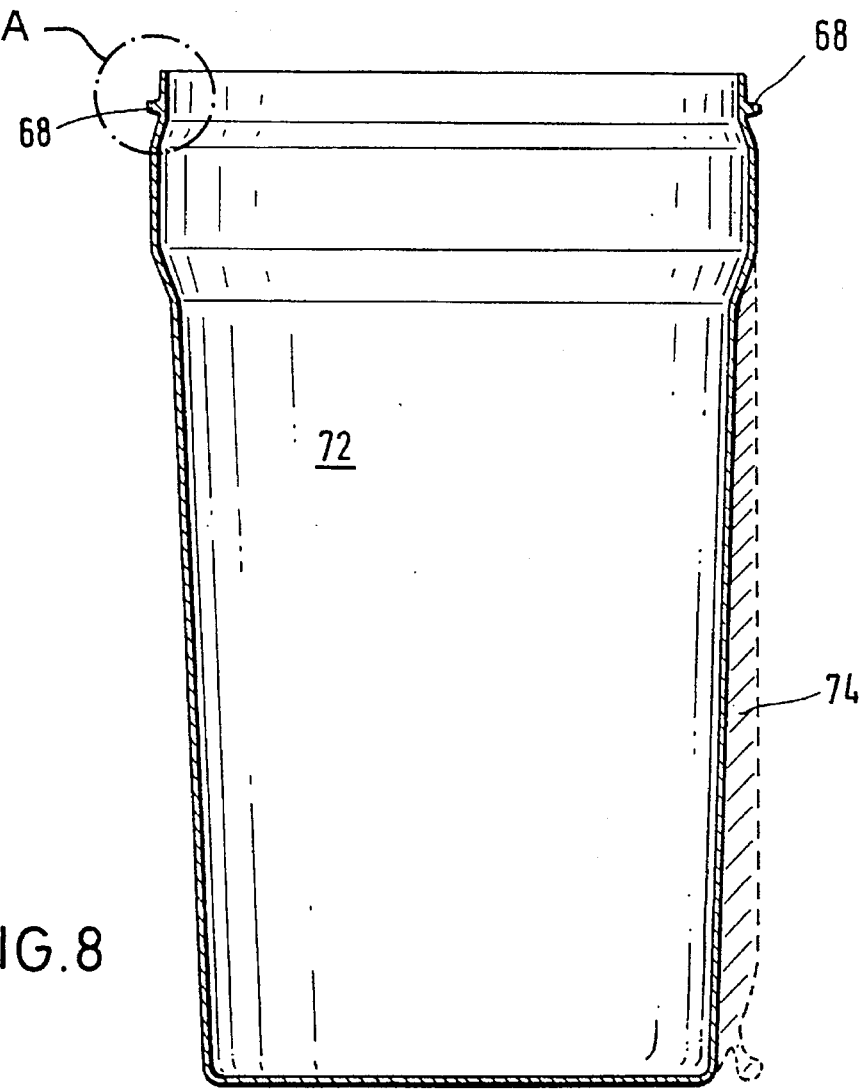

The invention is explained and described in more detail below with reference to example embodiments illustrated diagrammatically in the drawings, in which:

FIG. 1 shows a blow moulding machine having a conventional blowing mould for a removable-cover vessel, FIG. 2 shows a blowing mould having mould slides for a known plugged vessel, FIG. 3 shows a detail of the lower right-hand part of a blowing mould according to the invention, for a plugged vessel with carrying and transport ring, in the opened state of the mould slide, FIG. 4 shows the blowing mould from FIG. 3, in the closed state of the mould slide, FIG. 5 shows the blowing mould from FIG. 3, in a modified embodiment, for a removable-cover vessel, in the opened state of the mould slide, FIG. 6 shows the blowing mould from FIG. 5, in the closed state of the mould slide, FIG. 7 shows a partial illustration of a plugged vessel (left-hand half) and a removable-cover vessel (right-hand half) manufactured in the blowing mould according to the invention, and FIG. 8 shows a modified conical removable-cover vessel embodiment.

In FIG. 1, the reference numeral 10 designates a blow moulding machine (in accordance with the prior art) having horizontally displaceable mould halves 12 which are clamped on mould clamping plates, for a removable-cover vessel and above the blowing mould halves 12 there can be seen an accumulator head 14 having a tubular die 16 out of which a tubular preform 18 is extruded between the opened blowing mould halves 12. The preform 18 is slipped over the blowing mandrel 20, which is of comparatively large dimensions, from below, is pinched in between the closing mould halves 12 and is blown by means of compressed air blown in through the blowing mandrel to give the shape of the removable-cover vessel body corresponding to the internal contour of the blowing mould.

The mouth or vessel opening of the removable-cover vessel body is, during the manufacturing process, at the bottom of the blowing mould on the side of the blowing mandrel 20; the mould slide 22 for upsetting the casing flange from the material of the vessel wall of the vessel body is also arranged there.

In FIG. 2, for clarification there is shown a blowing mould 24 (in accordance with the prior art) for a known plugged vessel 26 with upper and lower carrying and transport ring 28 or handling ring. For upsetting the peripheral rings 28, the blowing mould 24 is equipped with an upper and a lower mould slide 30. The plugged vessel 26 is also manufactured in the conventional upside-down position in the blowing mould 24, with the two plug connection pieces being constructed and moulded in the upper surface of the plugged vessel 26 around the two blowing mandrels 32. The mould slides 30 are illustrated in the opened state in the left-hand part of the diagram—here, the preform is already blown—and in the closed state in the right-hand part of the picture; the carrying and transport rings 28 have already been massively upset and fused closed here.

In FIG. 3, the right-hand lower part of a blowing mould (half) 34 in accordance with the invention, with mould slides 30, for a plugged vessel with carrying and transport ring, is illustrated in longitudinal section.

The mould slide 30 with integrated threaded insert 76 is displaceable in the axial direction by means of a hydraulic drive 36 and by way of lifting rods 38, with the lift travel being for example approximately 45 mm in the case of a 220-liter plugged vessel.

The upper part 40 of the blowing mould 34 is equipped with a contour ring 42 which is screwed by means of a holding ring 44 onto the blowing mould part 40. Correspondingly thereto, secured on the axially displaceable mould slide 30 is a pinch ring 46. Serving as the securing means are threaded screws 48 which are preferably freely accessible from the outside or from below and which enable the ring inserts 42, 44, 46 to be simply exchanged without demounting the mould slide or the entire blowing mould. For this, through holes 80 are for example provided in the mould slide 30. The contour ring 42 and the holding ring 44 could of course also be constructed as a single ring insert part. In FIG. 3, the mould slide 30 with threaded insert 76 and pinch ring 46 has been moved downwards into the opened position. The tubular preform is blown outward into the annular space between the contour ring 42/holding ring 44 and pinch ring 46.

In FIG. 4, the mould slide 30 has been closed and the synthetic material in the annular space between contour ring 42/holding ring 44 and pinch ring 46 has been upset and fused to give a massive carrying and transport ring of the known advantageous construction (see the top left-hand side of FIG. 7).

FIG. 5 shows the basic mould of the blowing mould 34 in the state changed over for a removable-cover vessel body.

The contour ring 42 and pinch ring 46 for the plugged vessel have been removed and the contour ring 50 and pinch ring 52 with the contour of the casing flange and the vessel mouth of the removable-cover vessel body have been installed. The mould slide 30 is in the opened position and the tubular preform can be blown into the free annular space—delimited by the contour ring 50, holding ring 44 and pinch ring 52.

In FIG. 6, the mould slide 30 is closed and the synthetic material in the free annular space has been upset together and fused to give a massive casing flange (see the top right-hand side of FIG. 7).

In the embodiment illustrated, the pinch ring 52 (46) slides, on sliding movements of the whole slide, with the cylindrical outer wall on the corresponding cylindrical inner wall of the holding ring 44. When the sliding surfaces are worn down after a long period of operation, all that needs to be done is to insert a new holding ring 44 with a reduced or adapted internal diameter, as a wear part. For altering or reducing the mould slide travel, appropriate spacer pieces 78 are inserted.

The vessel types of different species which may be manufactured using the combined blowing mould are illustrated as parts of FIG. 7. The left-hand half of the diagram shows a plugged vessel 54 having at least one plug hole connection piece (not illustrated) in the closed plugged vessel upper surface 56 and having an upper carrying and transport ring 58 aligned as an almost axial extension to the vessel wall, as a first vessel type. The right-hand half of the diagram illustrates a standard removable-cover vessel with removable-cover vessel bodies 60, vessel cover 62 (with seal inserted) and clamping ring 64. The U-shaped clamping ring 64 reaches over the radially outwardly offset cover flange 66 and reaches under the massive casing flange 68, which is upset out of the vessel wall on which it is also radially outwardly offset, with the seal being pressed onto the vessel upper edge and the removable-cover vessel being sealed to be gas-and liquid-tight. Where necessary, the vessel cover 62 may also be equipped with one or two plug connection pieces.

The lower part of the vessel body of the plugged vessel and of the removable-cover vessel body are identical, with an almost cylindrical central part and a lower surface roll ring 70 for better rolling of a filled vessel in the tilted position.

In FIG. 8, finally, a further product variant is illustrated which may be manufactured by means of a further blowing mould insert 74 in the combined blowing mould.

The blowing mould insert 74, which is only diagrammatically indicated by means of dashed lines, substantially comprises two half shells whereof the internal contour corresponds to the external contour of the conical removable-cover vessel body 72 and whereof the external contour corresponds substantially to the internal contour of the blowing mould 34 (basic mould) or to the external contour of the removable-cover vessel body 60. In the case of the conical removable-cover vessel bodies 72 illustrated in FIG. 8—which may be stacked inside one another in the empty state—it is thus substantially only the upper vessel mouth region with casing flange 68 (as drawn separately on a larger scale) which corresponds to the vessel body of the cylindrical removable-cover vessel body 60 illustrated in FIG. 7 (right-hand half of the diagram). The conical blowing mould insert 74 may be fixed in a simple manner: constructed on the outside at the bottom of the blowing mould insert is a peripheral projection which corresponds exactly to the shape of the surface roll ring 70. The halves of the blowing mould insert are pushed with the projections into the surface roll ring cutout, and the surface roll ring mould slide is closed and holds the conical insert firmly and immovably. Where necessary, a further additional securing means (holding screw) may be provided at the top.

The alterations from the plug vessel blowing mould to the removable-cover vessel blowing mould is thus to be carried out with an extremely low expenditure: the pinch ring 46 and contour ring 42 (44) are removed, and the pinch ring 52 and contour ring 50 (44) are installed. In addition, a spacer piece 78 may be installed to reduce travel. The mould slide 40 and blowing mandrel 32 of the plugged version remain unchanged; the procedure control of the blowing mould equipment is not changed either.

For producing plugged vessels without an upper handling ring, instead of the pinch and contour rings appropriate blind inserts could be installed. Following the same scheme, the contours can also be changed in the lower surface region or in the upper and lower surface region at the same time.

Although multi-part blowing moulds for small containers (suitcase boxes or bottles) in which particular mouldings may be exchanged to change the container volume or a special design (bottle decoration) are known from the prior art, there is here no basic change in the product, but as stated merely a change in the suitcase size or the bottle (part) surface. In the present invention, two generically completely different large-volume vessel types may be manufactured in a single blowing mould.

The vessel manufacturer may thus adapt his blow moulding machine or blowing mould to different customer wishes or product shapes by means of simple rapid change-over measures.

I claim:

1. A blow moulding machine for making blow-moulded drums from thermoplastic synthetic material with an upset ring flange, comprising:

a blow mould including two horizontally displaceable blow mould halves for receiving an extruded tubular preform, each of said blow mould halves including a vertically displaceable mould slide, and a kit containing a first set of ring parts exhibiting a configuration for blow moulding a first type of drum, and a second set of ring parts exhibiting a configuration for blow moulding a second type of drum, said first and second sets of ring parts being exchangeably securable in said blow mould halves, said first and second sets of ring parts each including at least two circumferential ring-shaped pieces, with one ring-shaped piece forming a contour ring that is detachably secured to the blow mould halves and with another ring-shaped piece forming a pinch ring that is detachably secured on the mould slide and vertically displaceable to a position wherein said pinch ring cooperates with said contour ring to pinch said tubular preform in an annular pinching space between said contour ring and said pinching ring during blow moulding to form said flange.

2. The blow moulding machine of claim 1 wherein said first and second sets of ring parts are exchangeably securable in the blow mould without necessitating a dismantling of the blow mould and the mould slide.

3. The blow moulding machine of claim 1, further comprising fastening means for selectively securing the first and second sets of ring parts to the blow mould, said fastening means being accessible from outside the blow mould.

4. The blow moulding machine of claim 3 wherein said fastening means includes a threaded screw.

5. The blow moulding machine of claim 1 wherein the first type of drum is a bunged drum defined by a top end exhibiting a ring flange in form of a circumferential carrying and transport ring and at least one bunghole opening, said first set of ring parts having a configuration adapted to the contour of the carrying and transport ring.

6. The blow moulding machine of claim 1 wherein the second type of drum is a lidded drum defined by a top end exhibiting a ring flange in form of circumferential surface flange, said second set of ring parts having a configuration adapted to the contour of the surface flange.

7. The blow moulding machine of claim 1 wherein the blow mould halves have a fixed blow mould part which is stationary relative to the vertically displaceable mould slide, said contour ring being detachably secured to the fixed blow mould part.

8. The blow moulding machine of claim 1 wherein the blow mould includes a second mould slide for upsetting a second circumferential flange ring in form of a bottom roll ring at a transition region from a lower drum wall to the drum bottom.

9. The blow moulding machine of claim 1 wherein said kit further contains a half shell-shaped blow mould insert disposable in the blow mould in proximity of a lower drum wall for making a conical lidded drum, said insert exhibiting an approximately wedge-shaped cross section, with a broader side facing the drum bottom, and a narrower pointed side facing the drum mouth.

10. The blow moulding machine of claim 1 wherein the blow mould halves have a fixed blow mould part which is stationary relative to the vertically displaceable mould slide, and further comprising a spacer piece attachable between the mould slide and the fixed blow mould part for modifying the travel of the mould slide.

11. A process for making blow-moulded drums from thermoplastic synthetic material with an upset ring flange, comprising the steps of:

provided a kit containing a first set of ring parts exhibiting a configuration for blow moulding a first type of drum having a ring flange, and a second set of ring parts exhibiting a configuration for blow moulding a second type of drum having a ring flange, each set of ring parts including a contour ring and a pinch ring;

detachably mounting the first set of ring parts in a blow mould;

extruding a tubular preform into the blow mould equipped with the first set of ring parts and blow moulding the tubular preform in the blow mould;

vertically displacing said contour ring and pinching ring relative to one another thereby pinching the blow moulded preform between the contour and pinching rings to form the flange on the first type of drum;

removing the first type of drum from the blow mould;

removing the first set of ring parts from the blow mould and inserting the second set of ring parts;

extruding a second tubular preform into the blow mould equipped with the second set of ring parts and blow moulding the second tubular preform in the blow mould: and vertically displacing said contour ring and pinching ring of the second set of ring parts relative to one another thereby pinching the second blow moulded preform between the contour and pinching rings to form the flange on the second type of drum; and removing the second type of drum from the blow mould.

12. The process of claim 11 wherein the first type of drum is a bunged drum defined by a top end exhibiting a ring flange in form of a circumferential carrying and transport ring and at least one bunghole opening, and wherein the second type of drum is a lidded drum defined by a top end exhibiting a ring flange in form of circumferential surface flange, said providing step includes using the first set of ring parts to blow-mould the carrying and transport ring, and using the second set of ring parts to blow-mould the surface flange as support for a tension ring closure.

* * * * *